(12) United States Patent
Foster

(10) Patent No.: US 6,500,577 B2
(45) Date of Patent: Dec. 31, 2002

(54) MODULAR POLYMER ELECTROLYTE MEMBRANE UNIT FUEL CELL ASSEMBLY AND FUEL CELL STACK

(76) Inventor: Ronald B. Foster, 2426 Golden Oaks, Garland, TX (US) 75044

(*) Notice: Subject to any disclaimer, the term of this patent is extended or adjusted under 35 U.S.C. 154(b) by 74 days.

(21) Appl. No.: 09/745,566

(22) Filed: Dec. 26, 2000

(65) Prior Publication Data

US 2002/0081474 A1 Jun. 27, 2002

(51) Int. Cl.[7] ................................................ H01M 8/10
(52) U.S. Cl. ........................... 429/32; 429/30; 429/26; 429/34; 429/96
(58) Field of Search ....................... 429/32, 30, 26, 429/34, 96

(56) References Cited

U.S. PATENT DOCUMENTS

| | | |
|---|---|---|
| 4,876,115 A | 10/1989 | Raistrick |
| 5,171,646 A | 12/1992 | Rohr |
| 5,238,754 A | 8/1993 | Yasuo et al. |
| 5,532,072 A | 7/1996 | Spaeh et al. |
| 5,709,961 A | 1/1998 | Cisar et al. |
| 5,824,428 A | * 10/1998 | Nishida et al. ............... 429/26 |
| 5,945,232 A | * 8/1999 | Ernst et al. .................... 429/32 |

* cited by examiner

Primary Examiner—Carol Chaney
Assistant Examiner—Angela J Martin
(74) Attorney, Agent, or Firm—Arthur I. Navarro; Godwin Gruber, P.C.

(57) ABSTRACT

Disclosed is a polymer electrolyte membrane (PEM) fuel cell assembly apparatus for receiving an inserted membrane electrode assembly (MEA). The apparatus includes modular features for connecting a plurality of fuel cells into a planar fuel cell "stack" capable of using ambient air to supply oxidant gas and dissipate heat and water vapor. The invention also facilitates convenient removal and replacement of individual cells or MEAs in a stack without disassembly of the entire stack.

34 Claims, 5 Drawing Sheets

FIG. 3

MODULAR POLYMER ELECTROLYTE MEMBRANE UNIT FUEL CELL ASSEMBLY AND FUEL CELL STACK

TECHNICAL FIELD

This invention relates to Polymer Electrolyte Membrane (PEM) fuel cells and, in particular, to modular PEM fuel cells designed for assembly into fuel cell stacks. Additionally, the invention relates to fuel stack apparatus and methods with improved maintenance, scalability, and heat dissipation characteristics.

BACKGROUND OF THE INVENTION

Generally, fuel cells for the production of electrical energy from a fuel and oxidant are known in the art. In a fuel cell, electric power and water vapor (as a by-product) are produced when fluid hydrogen and oxygen, usually in the form of gases, provided to anode and cathode electrodes respectively, react through an electrolyte. Electric power produced is then collected by the lead lines. Essentially, the reaction is an oxidation of the fuel, but the method results in direct production of electrical energy, with heat energy being produced as a side effect. As an alternative to hydrogen gas, other fuels containing hydrogen may be used.

A good deal of concern in the art is directed to methods of stacking unit fuel cells in order to increase overall voltage output. A single cell, depending on design and application, may provide 0.3–1.5 volts output. Most battery replacement applications, for example, require 1.5–24 volts or more output voltage. The favored approach to increase voltage from that provided by a single cell is to physically stack a plurality of unit cell structures. This is commonly done with a sequentially stacked first gas diffusion layer, an anode electrode film, an electrolyte layer, a cathode electrode film, a second gas diffusion layer, and a bipolar connecting plate. The unit cells are electrically connected in series by means of conductive end plates. Generally, one end plate contacts the anode electrode of a first unit cell on one side of the stack, and another end plate contacts the cathode electrode of a last unit cell on the opposite side of the stack, with any number of similar cells stacked between.

In operation, hydrogen gas or other fuel is provided in the anode side of the fuel cell body, oxygen gas as oxidant is provided in the cathode side. The hydrogen and oxygen then react, producing a useful electric current, and water vapor as a by-product. The electrolyte can be a solid, a molten paste, a freeflowing liquid, or a liquid trapped in a matrix. The solid type of electrolyte, or Polymer Electrolyte Membrane (PEM), is well known in the art.

In the construction of fuel cells, several tradeoffs are made in order to optimize overall function in light of problems with the existing state of the art. Most currently known PEM fuel cells use a construction technique which incorporates the functions of anode electrode film, electrolyte, and cathode electrode film into a single unit, called a Membrane Electrode Assembly (MEA). This has the advantage of making assembly of stacked fuel cells more convenient. The conventional Gas Diffusion Assembly (GDA) provides for routing of gases to the MEA, and also for electrical contact with the MEA.

In the conventional PEM fuel cell stack of conventional unit fuel cells, a compressive force is applied to the end plates. This is transferred as a distributed force to the individual members of the stack. There may be many individual members of the stack, depending on the desired voltage output. For instance, if a single unit cell provided 0.6 volts, and a total of 24 volts output were desired, then there would be 40 unit cells in the total stack. A number of problems can occur as a consequence of this reliance on a distributed applied force to squeeze the stack together.

One such problem is that during operation, the membrane included in each MEA changes volume depending on both operating temperature and degree of hydration. The degree of hydration varies depending on operating circumstances. During the chemical reaction in the fuel cell, water vapor is produced as a by-product. This water vapor may back-diffuse from the cathode through the electrolyte, resulting in a substantial volume change in the electrolyte. In fact, the water cannot be completely eliminated, but rather, its presence in the electrolyte layer is helpful in maintaining high protonic conductivity. Therefore, the fuel cell design must accommodate substantial volume change of the electrolyte layer.

There exist tradeoffs between the need to accommodate swelling of the electrolyte layer, and the need for good electrical contact and fluid sealing. In the fuel cell stack design, a certain amount of compression is provided in order to ensure good electrical contact between adjacent unit fuel cell structures, as well as to maintain sealing of the fuel and oxidant fluids. As the volume change occurs, the effective "squeeze" or compressive pressure applied will vary. For a large number of stacked unit cells, the variation in distributed squeeze pressure can be pronounced. When squeeze pressure varies on the low side, then either leakage of supply fluids can occur, or electrical contacting resistance can increase. Both result in a loss of energy efficiency. When squeeze pressure varies on the high side, then catastrophic damage to one or more unit cells can result. Repair involves complete disassembly of the stack, troubleshooting to locate the damaged unit cells, replacement of damaged unit cells, and re-assembly of the stack. Such repairs can be quite costly, and add significantly to the life-cycle costs of the fuel cell stack.

Conventional approaches to fuel cell stack construction include systems for dissipating excess heat. A significant portion of the available energy output of a fuel cell stack can in fact be diverted to cooling fans or compressors in order to handle the heat load. In fact, fuel cell stack applications can be limited by the requirement to dissipate waste heat. Either power output must be reduced in order to prevent uncontrolled heat buildup, or a cooling system must be provided. A cooling system carries the serious disadvantages of cost, size, complexity, and loss of overall system thermodynamic efficiency.

There is a need for fuel cells designed for creating fuel cell stacks which overcome these problems, particularly in portable applications.

SUMMARY OF THE INVENTION

A Polymer Electrolyte Membrane (PEM) fuel cell assembly apparatus has a membrane electrode assembly (MEA). The apparatus has a body with a cavity for receiving the MEA and conductive elastomeric seals. The seals divide and hermetically separate the body cavity into a cathode chamber and an anode chamber. A fuel port is provided in the body for conducting fuel into the anode chamber. The cathode chamber is exposed to a source of oxygen. An integral connector included in the body provides an electrical path between the anode chamber and the outside of the body. An anode conductor provides an electrical path between the anode surface and the integral connector. A cathode conductor provides an electrical path between the cathode surface and an external connector, which extends outside of the body. In the preferred embodiment, a lid is provided for completing assembly and for maintaining compression of the components to maintain hermetic sealing and good electrical connections. The apparatus includes modular features for connecting a plurality of fuel cells into a fuel cell stack, and for facilitating removal and replacement of individual cells or MEAs in a stack. The fuel cell and stack are designed for inherent heat dissipation characteristics.

According to another aspect of the invention, individual fuel cell assemblies are incorporated into one integrated stack unit having multiple cavities. The integrated stack units are themselves stackable.

According to yet another aspect of the invention, a fuel cell stack with individual fuel cells has lids incorporated in one integrated unit having multiple apertures.

According to still another aspect of the invention, a fuel cell has snap connectors for mechanically and electrically coupling the fuel cell to one or more additional fuel cell to form a modular fuel cell stack.

The present inventions offer definite advantages over conventional systems and methods, particularly in terms of scalability, modularity, and the ease of configuring fuel cell stacks for particular voltage, size, shape, and heat dissipation characteristics according to the desired application.

BRIEF DESCRIPTION OF THE DRAWINGS

The features of the present invention will be more clearly understood from consideration of the following descriptions in connection with accompanying drawings in which.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not limit the scope of the invention. When referring to the drawings, like reference numbers are used for like parts throughout the various views. Directional references such as, top, bottom, upper, lower, left, right, used in the discussion of the drawings are intended for convenient reference to the drawings themselves as laid out on the page, and are not intended to limit the orientation of the invention unless specifically indicated. The drawings are not to scale and some features have been exaggerated in order to show particular aspects of the invention.

Figure 1A:
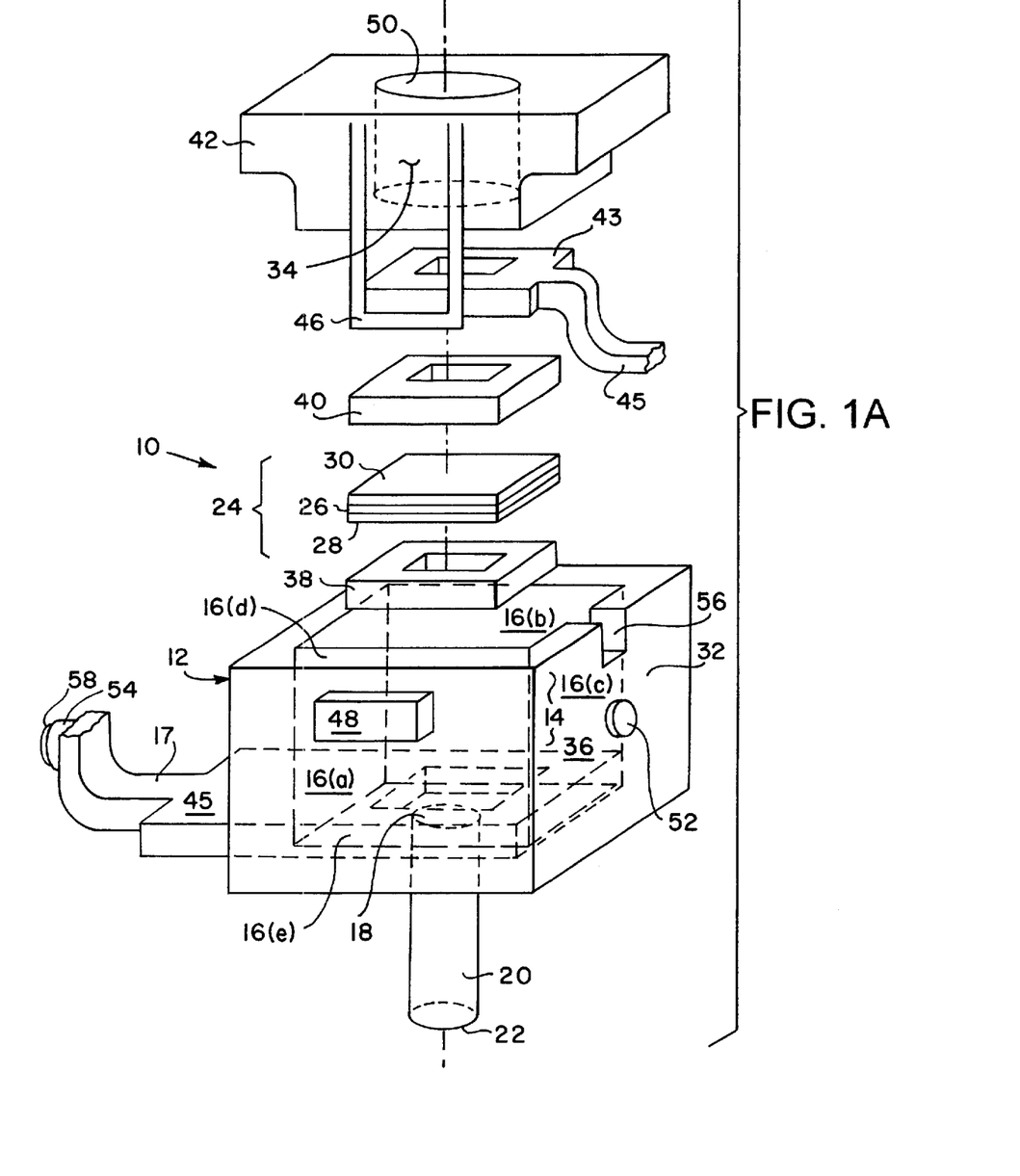
FIG. 1A is a top perspective exploded view illustrating an example of a fuel cell embodiment of the invention.

To better understand the invention, reference is made to FIG. 1A, showing an example of a PEM fuel cell assembly 10 according to the invention. A body 12, is preferably made from a rigid plastic or polymer material. The body 12 has an internal cavity 14 within, enclosed on five sides 16($a$–$e$). Additionally, the body 12 has an integral connector 17, which extends from the internal cavity 14 to the outside of the body 12. The shapes of the body 12, cavity 14 and integral connector 17 are not essential features of the invention as long as the aspects described herein can be achieved. Alternative body shapes, such as variously proportioned boxes based on a rectangle, hexagon, other polygon, or cylinder may be used. The sides 16($a$–$d$) of the cavity 14 are gas-tight. One side of the body, in this example side 16($e$), appearing at the bottom of FIG. 1, has a fuel aperture 18. The fuel aperture 18 coincides with the terminal end of a fuel port 20, which has a distal end 22 outside of the body 12 for connection to an external fuel source (not shown). The fuel port 20 is preferably an integrated portion of the body 12, although a separate attachment of suitable material may be used along with an appropriate gas-tight seal.

The cavity 14 is designed to receive a Membrane and Electrode Assembly (MEA) 24. The general structure of an MEA is known in the art. Typically, a Polymer Electrolyte Membrane (PEM) 26 is sandwiched between an anode 28 and a cathode 30. The MEA 24 is secured, preferably approximately midway 32 into the cavity 14 between an elastomeric anode conductor 38 and an elastomeric cathode conductor 40. The elastomeric anode conductor 38 and elastomeric cathode conductor 40 are preferably held by compression of the conductor 38, 40 edges against chamber 14 sides 16($a$–$d$), forming a gas-tight fit. The compression fit provides advantages in assembly and disassembly, but suitable sealing adhesives or one or more tabs (shown as tab 41 in FIG. 4 below) on the chamber sides 16 ($a$–$d$) may also be used. Thus, the cavity 14 is divided into a cathode chamber 34 and an anode chamber 36 defined and hermetically separated by the MEA 24 and conductors 38, 40. The anode conductor 38 provides an electrical path between the anode 28 of the MEA 24 and the integral connector 17. Similarly, the cathode conductor 40 provides an electrical path between the cathode 30 and an external connector 43. The external connector 43 is placed in electrical contact with the cathode conductor 40 and extends to the exterior of the body 12. The conductors 38, 40, are made from an elastomer material such as VITON, a registered trademark of A:, DuPont Dow Elastomers, L.L.C., of Wilmington, Del, although alternative conductive elastomer materials may also be used. Of course, the various conductors 17, 38, 40, 43 are configured to permit gas flow to the MEA surfaces. Appropriate modifications are made to the elastomer material such that a conductive path exists between the top and bottom surfaces of the elastomeric conductor but such that the material does not conduct in a lateral (x-y axis) direction. To those skilled in the art, such a modified elastomer is generally referred to as a z-axis conductive elastomer.

Further referring to FIG. 1A, the presently preferred embodiment of the invention includes a lid 42 covering the cathode chamber 34. The lid 42, preferably made from the same material as the body, is attached to the body 12. The attachment is preferably formed by a snap-type connector with a female portion 46 attached to the lid 42 and a male portion 48 attached to the body 12 in a manner known in the arts such that a removable connection can be readily secured and unsecured, typically without using tools. Other types of removable connectors may be substituted. The lid 42 has an oxidant aperture 50, preferably opposite the cathode 30 of the MEA 24. The oxidant aperture 50 preferably allows ambient air to reach the cathode 30, and allows heat and water vapor to be expelled from the cathode chamber 34. It should be understood that the exact shape and configuration of the oxidant aperture 50 and cathode conductor 40 are not critical to the invention and may be varied by those skilled in the arts. Preferably, the shapes of the lid 42, oxidant aperture 50, external connector 43 and integral conductor 17, may be modified to maximize heat dissipation to the surrounding air. For example, a heat-dissipation surface 45 extending outside of the body 12 can be provided on the external connector 43. Of course, heat-dissipation surfaces may also be incorporated into the body 12 as well. Optionally, conventional porting may be attached to the oxidant aperture 50 for conducting an oxidant, usually pure oxygen or air, to the cathode 30.

Figure 1B:
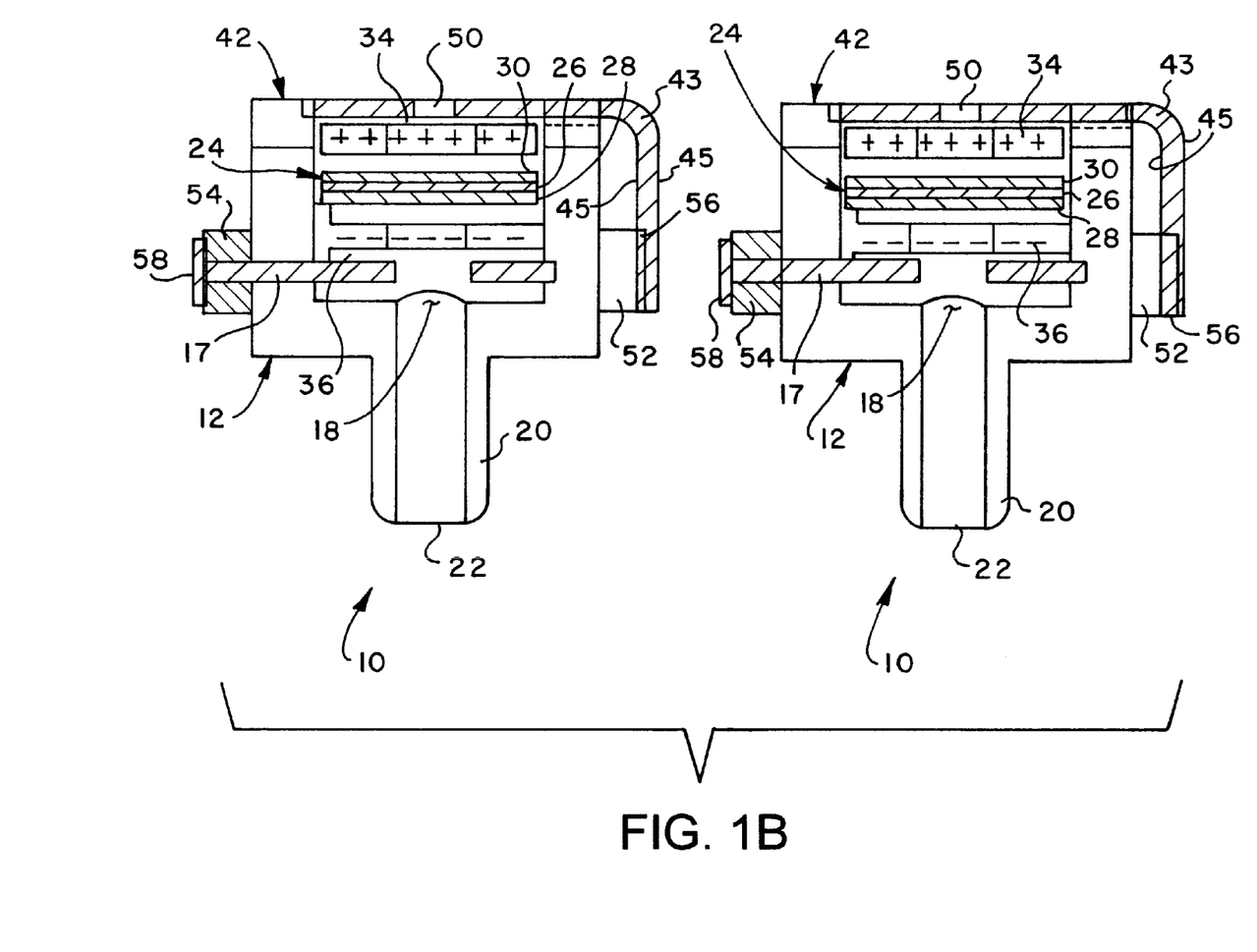
FIG. 1B is a side view depicting an example of a fuel cell stack of the invention with individual fuel cells of FIG. 1.

Now referring primarily to FIG. 1B, the body 12 of the PEM fuel cell assembly 10 has integral snap connectors formed of peg portions 52 and socket portions 54 on the outside surfaces of the body 12 for mechanically and electrically coupling a plurality of the fuel cell assemblies 10. In this example, peg connector 52 and socket connector 54 incorporate the terminal ends, 58, 56, of the external and integral connectors 17, 43, respectively. It will be appreciated that a first fuel cell stack 60 of the invention may thus be readily assembled by connecting a plurality of individual fuel cell assemblies 10. The terminal ends 58, 56 of the external connector 17, and the integral connector 43, form "positive" and "negative" electrical connections for output power connection to a driven device (not shown). It will be apparent to those skilled in the arts, that integral connectors 17 and adjacent external connectors 43 may be directly connected in series. Additional connecting conductors may of course also be used to provide an electrical path between interior anode conductors 38 and interior cathode conductors 40, if spacing between the cells is to be increased, or to increase the modularity of the design. The individual fuel cells 10 may be arranged in planar, staggered, or overlapping rows or arrays, depending on the space and heat dissipation requirements of a particular application.

Figure 2:
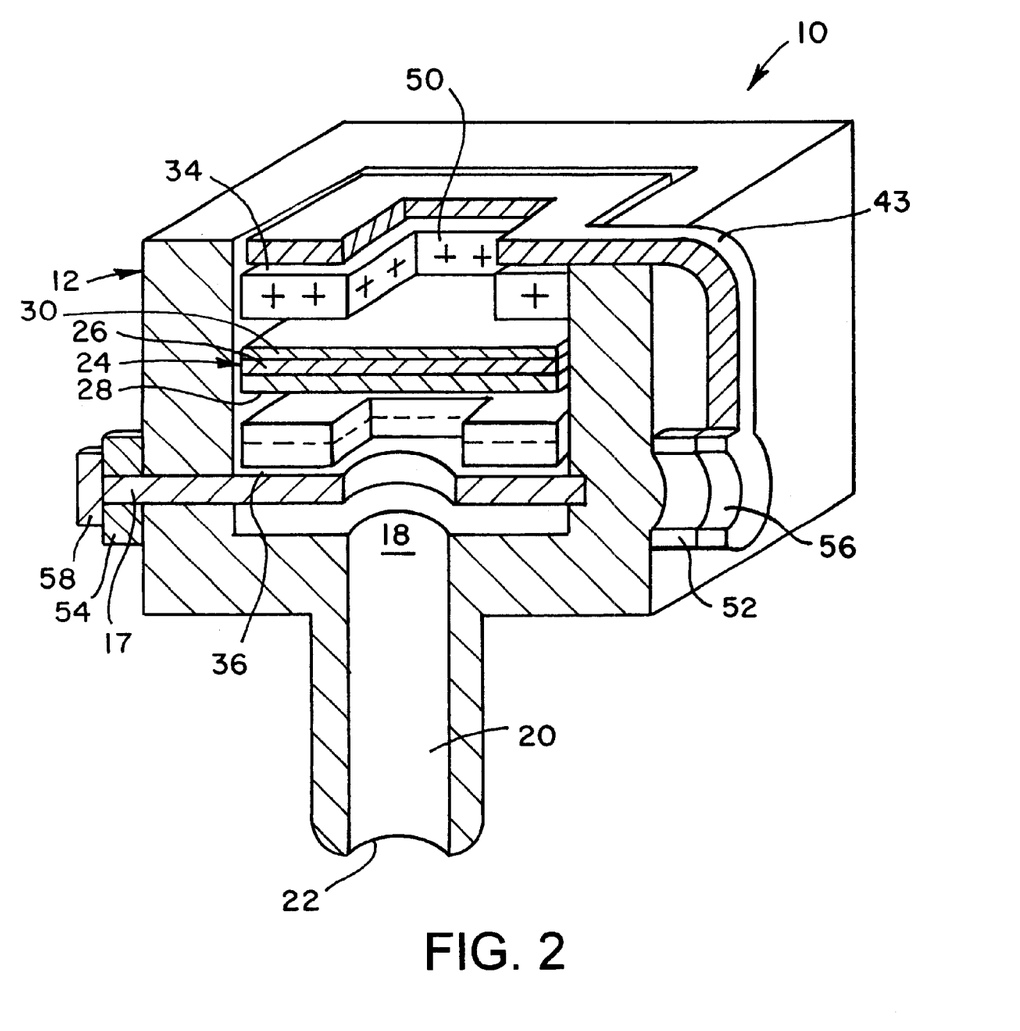
FIG. 2 is a top perspective view of an alternative example of a fuel cell embodiment in accordance with the invention.

FIG. 2 shows an example of an alternative embodiment of the fuel cell 10 of the invention. In this example, the oxidant aperture 50 is defined by the upper edges of side walls 16(a–d) of the body 12. The lid 42 of the embodiment of FIG. 1 is omitted. In other respects, this embodiment is carried out substantially as described for the example discussed with reference to FIGS. 1A and 1B.

Figure 3:
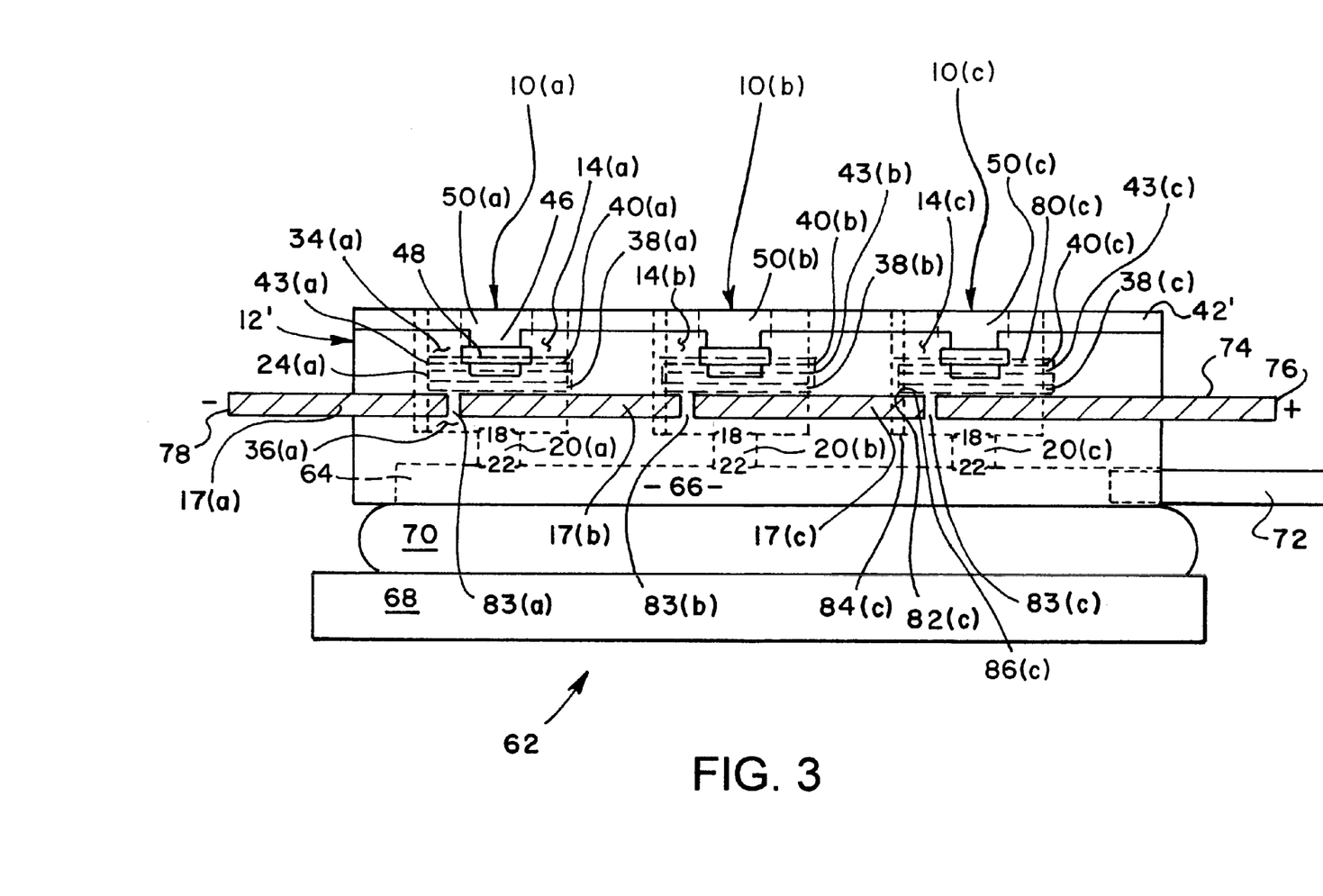
FIG. 3 is a side view depicting an example of an embodiment of a fuel cell stack with three fuel cells made in accordance with the invention having a unitized body and a common lid.

In FIG. 3, an example of three fuel cells 10 of the invention are shown in a second fuel cell stack 62. In this embodiment of the invention, a unitized body 12' has three individual cavities 14(a–c). Three individual fuel cell assemblies 10(a–c) according to the invention are assembled in the individual cavities 14(a–c). The unitized body 12', is preferably made from rigid plastic or polymer material, as discussed above. The structure of each of cells 10(a–c) containing an individual MEA 24, is substantially as discussed with reference to FIG. 1A above with the following notable differences.

The individual cell fuel ports 20 are preferably integrated portions of the unitized body 12'. The distal ends 22 of the fuel ports 20 are in fluid communication with a common fuel manifold 64. Preferably, the manifold 64 is formed by a manifold cavity 66 integrated into the unitized body 12' and attached to a bottom material, preferably a flat substrate 68 made from the same material as the body, by a sealing material 70 such as an adhesive generally known as epoxy. Of course the substrate and sealing material may be made from alternative materials without altering the character of the invention so long as a gas-tight seal is provided. A fuel supply port 72 is connected to the manifold 64, preferably at one end.

The second fuel cell stack embodiment 62 also preferably includes a common lid 42', preferably made from the same material as the unitized body 12', covering the cathode chambers 34(a–c) of the individual cells 10(a–c). The common lid 42' is preferably attached to the unitized body 12' by a plurality of snap-type connectors with female portions 46 attached to the common lid 42' and male portions 48 attached to the unitized body 12' in a manner known in the arts such that a removable connection can be readily secured and unsecured, typically without using tools. Other types of removable connectors may be substituted. The common lid 42' has oxidant apertures 50(a–c) corresponding to each cathode chamber 34(a–c), preferably opposite the cathodes 30 of the MEAs 24.

It will be apparent to those skilled in the arts, that integral connectors 17(a–c) and adjacent external connectors 43(a–c) may be directly connected in series. Integral connectors 17(b,c) and external connectors 43,b) provide an electrical path within the stack 62. That is, integral connector 17(a) is in electrical contact with anode conductor 38(a). External connector 43(a) is in electrical contact with integral connector 17(b), which is in turn in electrical contact with anode conductor 38(b). Continuing the path through the stack, external connector 43(b) is in electrical contact with integral connector 17(c), which is in turn in electrical contact with anode conductor 38(c). External connector 43(c) is then in electrical contact with outer conductor 74, completing the path. The anode conductors 38(a–c) are thus in series electrical contact with an outer conductor 74. The outer conductor 74 has a "positive" end 76 connected to a terminal conductive spring 80(c), and a "negative" end 78 formed by a terminal integral connector 17(a), for providing an electrical output to a driven device (not shown).

Figure 4:
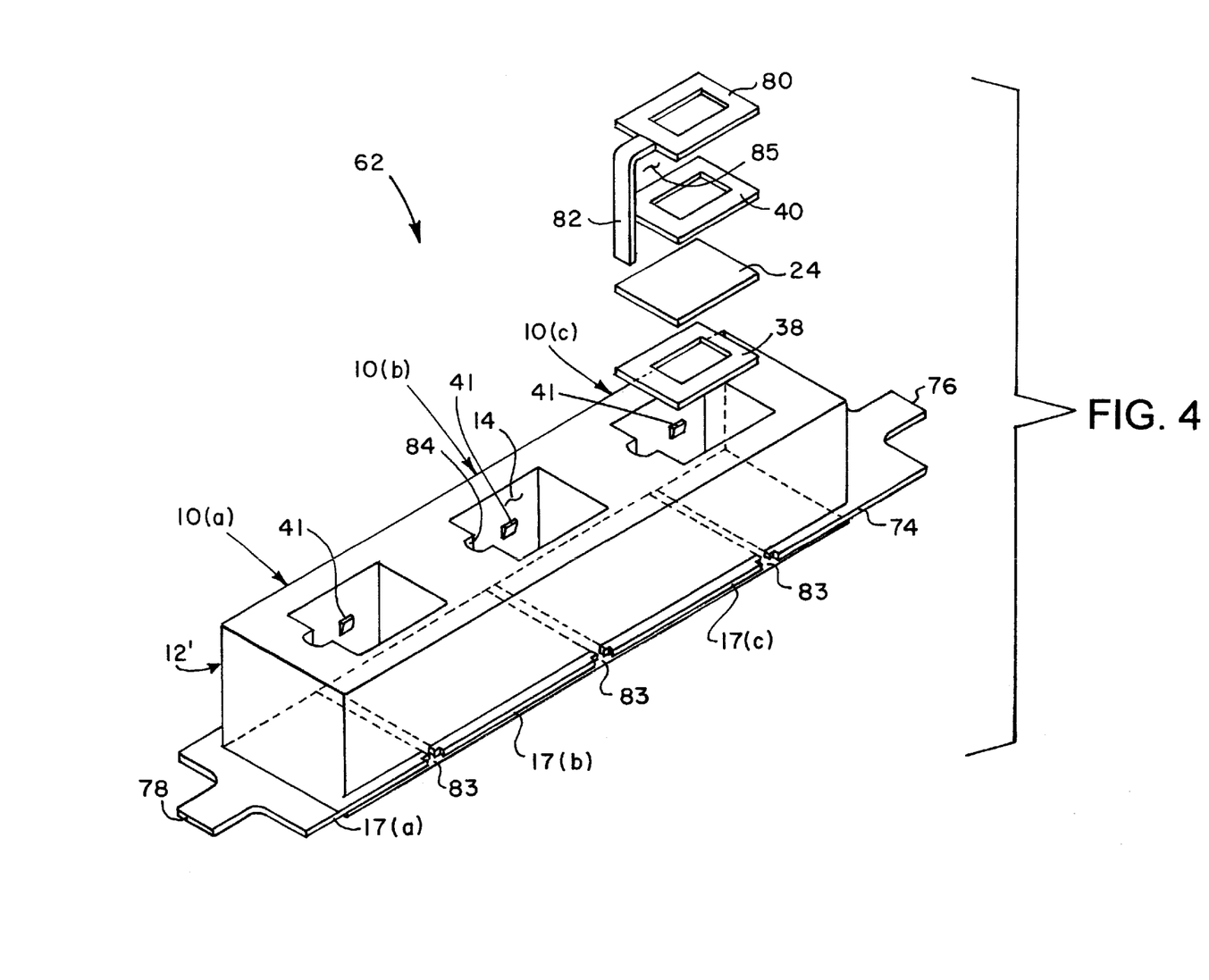
FIG. 4 is a top front perspective view depicting an example of an embodiment of a fuel cell stack of FIG. 3 having a conductive spring.

As can also be seen in FIG. 4, the fuel cell stack 62 may be provided with a conductive spring 80 preferably made of a conductive material such as metal. The conductive spring 80 is inserted into the cavity 14 such that its inner surface makes electrical contact with the cathode conductor 40. The conductive spring 80 may be secured by tabs 41 or with a snap-on lid (42, FIG. 1) as described above. The conductive spring 80 has a shank 82, preferably at one edge extending through a slot 84 in the body 12'. Preferably, a space 85 between the shank 82 and the anode conductor 38 prevents electrical contact between the two elements. As will be apparent to those skilled in the art, it is essential that the shank 82 be prevented from completing a short circuit between both the anode conductor 38 and cathode conductor 40, although other structures, such as insulation may be used.

It should be understood that many variations in the exact configuration and application of the invention are possible without departing from the inventive concepts. For example: The exact shape and configuration of the oxidant apertures and conductors are not critical to the invention and may be varied by those skilled in the arts: The shapes of the body and/or lid may be varied to enhance heat dissipation or to produce a desired shape according to the specific application: In a first or second fuel cell stack, a common lid may be used with singular bodies or vice versa. Of course, in principle, there is no limitation in the number of individual fuel cells which may be connected to form a fuel cell stack according to the invention.

Advantages realized by the invention include but are not limited to ease of assembly, ease of access for repair and replacement of MEAs, scalabiltiy allowing freedom to create custom fuel cell stacks of virtually any useful voltage, and freedom to arrange cells in a stack application according to space and heat dissipation requirements. The ability to arrange fuel cells in a planar orientation is considered particularly advantageous for using ambient air to supply the oxidant and dissipate heat and excess water. The invention has many other advantages that will be apparent to those versed in fuel cell technology and related arts.

The embodiments shown and described above are only exemplary. Many details are often found in the art such as variations in materials and connection of parts. Therefore many such details are neither shown nor described. It is not claims that all of the details, parts, elements, or steps described and shown were invented herein. Even though numerous characteristics and advantages of the present inventions have been set forth in the foregoing description, together with details of the structure and function of the inventions, the disclosure is illustrative only, and changes may be made in the detail, especially in matters of arrangement of the functional parts within the principles of the inventions to the full extent indicated by the broad general meaning of the terms used in the attached claims.

I claim:

1. A Polymer Electrolyte Membrane (PEM) fuel cell assembly comprising:
    a body having a cavity for receiving a Membrane Electrode Assembly (MEA), wherein the cavity is hermetically divisible into a cathode chamber and an anode chamber by the insertion of an anode conductor, a cathode conductor, and an MEA;
    an integral connector projecting from the anode chamber to the exterior of the body; and
    an external connector projecting from the cathode chamber to the exterior of the body.

2. A PEM fuel cell assembly according to claim 1 further comprising:
    an anode conductor in hermetically-sealing contact with the cavity walls and electrically coupled to the integral connector; and
    a cathode conductor in contact with the cavity walls and electrically coupled to the external connector.

3. A PEM fuel cell assembly according to claim 1 further comprising an MEA inserted into the cavity, the MEA having an anode surface in electrically-coupling and hermetically-sealing contact with the anode conductor, a central membrane, and an opposing cathode surface in electrically-coupling contact with the cathode conductor.

4. A PEM fuel cell assembly according to claim 1 further comprising at least one locking tab on the inner surface(s) of the chamber for grasping the anode conductor, cathode conductor, and MEA.

5. A PEM fuel cell assembly according to claim 1 wherein the external connector comprises at least one heat-dissipation surface.

6. A PEM fuel cell assembly according to claim 1 wherein the integral connector comprises at least one heat-dissipation surface.

7. A PEM fuel cell assembly according to claim 1 wherein the anode conductor and the cathode conductor comprise an elastomeric material.

8. A PEM fuel cell assembly according to claim 1 further comprising connectors on the body for mechanically and electrically coupling a plurality of the fuel cell assemblies.

9. A PEM fuel cell assembly according to claim 1 further comprising an integrated fuel port portion of the body for conducting fuel into the anode chamber through a fuel aperture.

10. A PEM fuel cell assembly according to claim 9 wherein the fuel aperture is opposite the anode surface of the MEA.

11. A PEM fuel cell assembly according to claim 1 further comprising a lid for covering the cathode chamber, the lid removably securable to the body and having an aperture opposite the cathode surface of the MEA.

12. A PEM fuel cell assembly according to claim 11 wherein the external connector is incorporated into the lid.

13. A PEM fuel cell assembly according to claim 12 further comprising a snap-lock coupling for removably securing the lid to the body.

14. A PEM fuel cell stack assembly comprising:
    a plurality of bodies, each body having one or more connector for joining to an identical body, each body also having a cavity for receiving a Membrane Electrode Assembly (MEA), wherein each cavity is hermetically divisible into a cathode chamber and an anode chamber by the insertion of an anode conductor, a cathode conductor, and an MEA;
    an integral connector projecting from each anode chamber to the exterior of each body;
    an external connector projecting from each cathode chamber to the exterior of each body;
    an anode conductor in each cavity and in hermetically-sealing contact with the cavity walls and electrically coupled to an integral connector;
    a cathode conductor in each cavity in contact with the cavity walls and electrically coupled to an external connector; and
    an MEA inserted into each cavity, each MEA having an anode surface in electrically-coupling and hermetically-sealing contact with an anode conductor, a central membrane, and an opposing cathode surface in electrically-coupling and hermetically-sealing contact with a cathode conductor;
    wherein the integral connectors and external connectors are electrically coupled in series for providing a continuous electrical path between the anode conductor of a body and the cathode conductor of an adjacent body.

15. A PEM fuel cell stack assembly according to claim 14 further comprising at least one locking tab on the inner surface(s) of at least one chamber for grasping the anode conductor, cathode conductor, and MEA therein.

16. A PEM fuel cell stack assembly according to claim 14 wherein at least one external connector comprises at least one heat-dissipation surface.

17. A PEM fuel cell stack assembly according to claim 14 wherein at least one integral connector comprises at least one heat-dissipation surface.

18. A PEM fuel cell assembly according to claim 14 wherein the cathode conductors and anode conductors comprise an elastomeric material.

19. A PEM fuel cell stack assembly according to claim 15 further comprising an integrated fuel port portion of each body for conducting fuel into each anode chamber through a corresponding fuel aperture.

20. A PEM fuel cell stack assembly according to claim 19 wherein each fuel aperture is opposite the anode surface of its respective MEA.

21. A PEM fuel cell stack assembly according to claim 15 further comprising one or more lids for covering the cathode chambers, the lids removably securable to the bodies and having apertures opposite each cathode surface of each respective MEA.

22. A PEM fuel cell stack assembly according to claim 21 wherein the external connectors are incorporated into each lid.

23. A PEM fuel cell stack assembly according to claim 21 further comprising one or more snap-lock couplings for removably securing the lids to the bodies.

24. A PEM fuel cell stack assembly comprising:
- a unitized body having a plurality of cavities wherein each cavity is hermetically divisible into a cathode chamber and an anode chamber by the insertion of an anode conductor, a cathode conductor, and an MEA;
- an integral connector projecting from each anode chamber;
- an external connector projecting from each cathode chamber;
- an anode conductor in each cavity and in hermetically-sealing contact with the cavity walls and electrically coupled to an integral connector;
- a cathode conductor in each cavity in contact with the cavity walls and electrically coupled to an external connector at each cavity;
- an end connector electrically coupled to the terminal external connector; and
- an MEA inserted into each cavity, each MEA having an anode surface in electrically-coupling and hermetically-sealing contact with an anode conductor, a central membrane, and an opposing cathode surface in electrically-coupling contact with a cathode conductor;
- wherein the integral connectors and external connectors are electrically coupled in series for providing a continuous electrical path between an anode conductor and a corresponding cathode conductor.

25. A PEM fuel cell stack assembly according to claim 24 further comprising at least one locking tab on the inner surface(s) of at least one chamber for grasping the anode conductor, cathode conductor, and MEA therein.

26. A PEM fuel cell stack assembly according to claim 24 wherein at least one external connector comprises at least one heat-dissipation surface.

27. A PEM fuel cell stack assembly according to claim 24 wherein at least one integral connector comprises at least one heat-dissipation surface.

28. A PEM fuel cell stack assembly according to claim 24 wherein each external connector comprises a conductive spring electrically coupled with the cathode conductor for providing electrical connection to an adjacent integral connector.

29. A PEM fuel cell assembly according to claim 24 wherein the cathode conductors and anode conductors comprise an elastomeric material.

30. A PEM fuel cell stack assembly according to claim 24 further comprising an integrated fuel port portion of each body for conducting fuel into each anode chamber through a corresponding fuel aperture.

31. A PEM fuel cell stack assembly according to claim 30 wherein each fuel aperture is opposite the anode surface of its respective MEA.

32. A PEM fuel cell stack assembly according to claim 24 further comprising of one or more lids for covering the cathode chambers, the lids removably securable to the bodies and having apertures opposite each cathode surface of each respective MEA.

33. A PEM fuel cell stack assembly according to claim 32 wherein the external connectors are incorporated into each lid.

34. A PEM fuel cell stack assembly according to claim 32 further comprising one or more snap-lock couplings for removably securing the lids to the bodies.

* * * * *